United States Patent
Lee et al.

(10) Patent No.: US 9,799,892 B2
(45) Date of Patent: Oct. 24, 2017

(54) ELECTROCATALYST FOR OXYGEN REDUCTION INCLUDING SILVER/SILVER HALIDE COMPOSITE, FUEL CELL INCLUDING THE SAME, AND PREPARING METHOD OF THE SAME

(71) Applicant: Ewha University—Industry Collaboration Foundation, Seoul (KR)

(72) Inventors: Youngmi Lee, Seoul (KR); Chongmok Lee, Seoul (KR); Jun Ho Shim, Daegu (KR); Su-jin Kim, Jinju-si (KR)

(73) Assignee: Ewha University Industry Collaboration Foundation, Seoul (KR)

( * ) Notice: Subject to any disclaimer, the term of this patent is extended or adjusted under 35 U.S.C. 154(b) by 191 days.

(21) Appl. No.: 13/860,660

(22) Filed: Apr. 11, 2013

(65) Prior Publication Data
US 2013/0273458 A1    Oct. 17, 2013

(30) Foreign Application Priority Data
Apr. 12, 2012    (KR) .................. 10-2012-0037944

(51) Int. Cl.
*H01M 4/90* (2006.01)
*H01M 8/1018* (2016.01)

(52) U.S. Cl.
CPC ............ *H01M 4/90* (2013.01); *H01M 4/9041* (2013.01); *H01M 2008/1095* (2013.01)

(58) Field of Classification Search
CPC ................................ B01J 27/06; B01J 27/055
USPC .................................................. 502/224, 100
See application file for complete search history.

(56) References Cited

U.S. PATENT DOCUMENTS

| | | | | |
|---|---|---|---|---|
| 2003/0068544 A1* | 4/2003 | Cisar | .................. | C25B 1/06 429/524 |
| 2007/0292735 A1* | 12/2007 | McMahon | .............. | H01M 4/86 429/431 |
| 2008/0274391 A1* | 11/2008 | Bose | .................. | H01M 4/923 429/483 |
| 2010/0010243 A1* | 1/2010 | Linic | .................. | C07D 301/10 549/538 |
| 2010/0316920 A1* | 12/2010 | Makita | .............. | H01M 8/04089 429/432 |

OTHER PUBLICATIONS

D. Wang et al., 'Novel preparation method for a new visible light photocatalyst—mesoporous TiO2 supported Ag—AgBr', Journal of Materials Chemistry, 2012, 22, pp. 4847-4854*
Yingpu Bi et al.,"In situ oxidation synthesis of Ag/AgCl core-shell nanowires and their photocatalytic properties", Chem. Commun. ,2009, pp. 6551-6553.*
D. Wang et al., 'Novel preparation method for a new visible light photocatalyst—mesoporous TiO2 supported Ag—AgBr', Journal of Materials Chemistry, 2012, 22, pp. 4847-4854.*
(Continued)

*Primary Examiner* — Patrick Ryan
*Assistant Examiner* — Kiran Akhtar
(74) *Attorney, Agent, or Firm* — Greer, Burns & Crain, Ltd.

(57) ABSTRACT

The present disclosure relates to an electrocatalyst for oxygen reduction including a silver/silver halide composite, a fuel cell including the electrocatalyst for oxygen reduction, and a method for preparing the electrocatalyst for oxygen reduction.

12 Claims, 9 Drawing Sheets

(56) References Cited

OTHER PUBLICATIONS

L. Kuai et al., "Facile Subsequently Light-Induced Route to Highly Efficient and Stable Sunlight-Driven Ag—AgBr Plasmonic Photocatalyst", Langmuir 2010 26 (24), 18723-18727.*

Yingpu Bi et al., "In situ oxidation synthesis of Ag/AgCl core—shell nanowires and their photocatalytic properties", Chem. Commun., 2009, pp. 6551-6553.

Jihye Yang, "Oxygen reduction electrocatalyst: A study of activation using SECM, the development of bimetallic catalyst based on silver nanowire", Ewha University, 2011.

* cited by examiner

FIG. 2
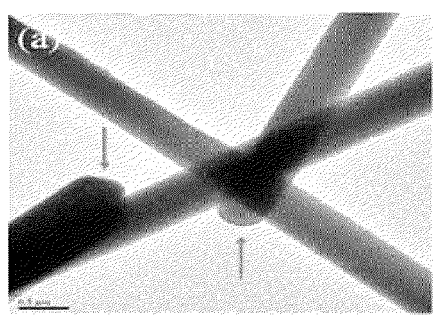
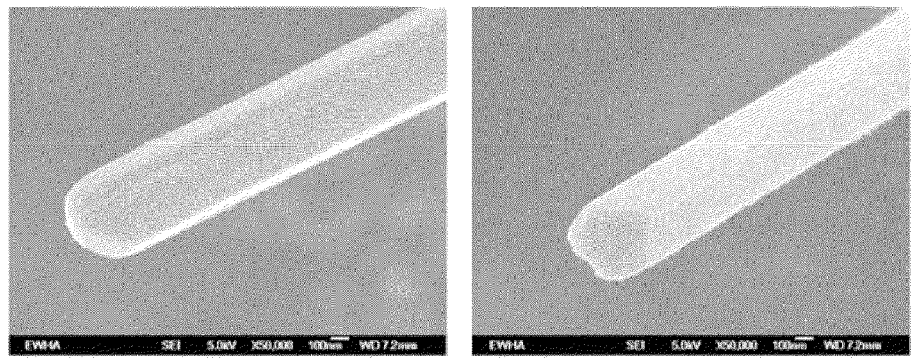

ELECTROCATALYST FOR OXYGEN REDUCTION INCLUDING SILVER/SILVER HALIDE COMPOSITE, FUEL CELL INCLUDING THE SAME, AND PREPARING METHOD OF THE SAME

CROSS-REFERENCE TO RELATED APPLICATION

This application claims the benefit of Korean Patent Application No. 10-2012-0037944 filed on Apr. 12, 2012, the entire disclosures of which are incorporated herein by reference.

FIELD OF THE INVENTION

The present disclosure relates to an electrocatalyst for oxygen reduction including a silver/silver halide composite, a fuel cell including the electrocatalyst for oxygen reduction, and a method for preparing the electrocatalyst for oxygen reduction.

BACKGROUND OF THE INVENTION

A fuel cell is a device for changing chemical energy into electric energy. In a general fuel cell, a gas phase fuel such as hydrogen is supplied to an anode (electrode for oxidation), and an oxidizer such as oxygen is supplied to a cathode (electrode for reduction). Once the fuel is oxidized in the anode, electrons are discharged from the fuel to an external circuit connected to the anode and the cathode. In the cathode, the oxidizer is reduced by using the electrons provided by the oxidized fuel.

In a hydrogen/oxygen fuel cell, hydrogen is supplied to an anode, and oxygen is supplied to a cathode. The hydrogen is oxidized to form hydrogen ions and simultaneously discharge electrons to an external circuit. The hydrogen ions move to the cathode through a conductive polymer film to react with the oxygen species thereby forming water. A typical reaction of a hydrogen/oxygen fuel cell is as follows:

Anode: $2H_2 \rightarrow 4H^+ + 4e^-$     (1)

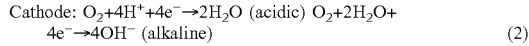

Cathode: $O_2 + 4H^+ + 4e^- \rightarrow 2H_2O$ (acidic) $O_2 + 2H_2O + 4e^- \rightarrow 4OH^-$ (alkaline)     (2)

Net reaction: $2H_2 + O_2 \rightarrow 2H_2O$     (3)

In order to cause the oxidation reaction and the reduction reaction in the fuel cell at a rapid reaction rate and a low overpotential, an electrocatalyst is required. Where no eletrocatalyst exists, a general electrode reaction occurs in a very high potential state. The eletrodecatalyst increases the electrochemical reaction rate, and thus, can operate the fuel cell at a low potential.

Meanwhile, since platinum has a high catalyst property, platinum and a platinum alloy material are generally used as electrocatalysts for an anode and a cathode of a fuel cell. However, platinum is disadvantageous because it is highly expensive and increases the preparation costs for the fuel cell.

Accordingly, development of a low-priced electrocatalyst, which has the same catalyst property as that of platinum or an improved catalyst property over that of platinum, has been demanded.

The present disclosure provides an electrocatalyst, which improves efficiency of an oxygen reduction reaction (ORR) in a fuel cell and contains no platinum. Specifically, the present disclosure provides an electrocatalyst for oxygen reduction including a silver/silver halide composite, a fuel cell including the electrocatalyst for oxygen reduction, and a method for preparing the electrocatalyst for oxygen reduction.

However, the objectives sought to be achieved by the present disclosure are not limited to those described above. Other objectives, which are sought to be achieved by the present disclosure but are not described herein, can be clearly understood by one of ordinary skill in the art from the descriptions below.

BRIEF SUMMARY OF THE INVENTION

In accordance with a first aspect of an illustrative embodiment, there is provided an electrocatalyst for oxygen reduction, comprising a silver/silver halide composite.

In accordance with a second aspect of the illustrative embodiment, there is provided a fuel cell comprising the electrocatalyst for oxygen reduction according to the first aspect of present disclosure.

In accordance with a third aspect of the illustrative embodiment, there is provided a method for preparing the electrocatalyst for oxygen reduction according to the first aspect of present disclosure, comprising forming a silver nanomaterial, and combining a silver halide with the silver nanomaterial.

In accordance with a fourth aspect of the illustrative embodiment, there is provided a method for increasing stability of an electrocatalyst for oxygen reduction, comprising adding from about 0.1 mM to about 100 mM of NaCl to an anode electrolyte environment in which the oxygen reduction occurs.

In accordance with a fifth aspect of the illustrative embodiment, there is provided a fuel electrode for a fuel cell, comprising a silver/silver halide composite.

EFFECT OF THE INVENTION

Since the electrocatalyst for oxygen reduction in accordance with the present disclosure does not contain expensive platinum, preparation costs in preparing a fuel cell by using the electrocatalyst for oxygen reduction can be significantly reduced. Also, the electrocatalyst for oxygen reduction exhibits excellent oxygen reduction catalytic activity and stability, etc., in an alkaline medium, compared to a conventional electrocatalyst for oxygen reduction. The electrocatalyst for oxygen reduction can also increase its resistance to ethanol. Accordingly, since the electrocatalyst for oxygen reduction has a superior electron transfer property, it also corresponds to a fuel electrode.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIG. 2 provides transmission electron microscope (TEM) and scanning electron microscope (SEM) photographs of a pure silver nanowire in accordance with an example of the present disclosure;

DETAILED DESCRIPTION OF THE INVENTION

Figure 1:
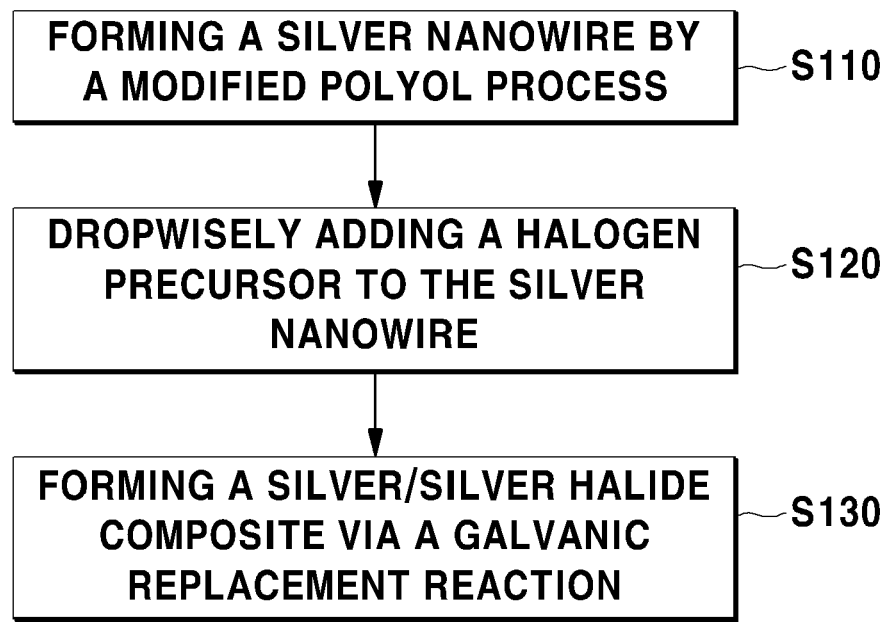
FIG. 1 is a sequence view of a method for preparing an electrocatalyst for oxygen reduction including a silver/silver halide (Ag/AgBr) nanowire in accordance with an illustrative embodiment of the present disclosure.

Hereinafter, illustrative embodiments and examples of the present disclosure will be described in detail with reference to the accompanying drawings so that inventive concept may be readily implemented by those skilled in the art.

However, it is to be noted that the present disclosure is not limited to the illustrative embodiments and the examples but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Through the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" means that one or more other components, steps, operations, and/or the existence or addition of elements are not excluded in addition to the described components, steps, operations and/or elements.

The terms "approximately or about" or "substantially" are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the whole document, the term "halogen" or "halo" means chlorine, bromine, fluorine, or iodine.

Throughout the whole document, the terms "A and/or B" means "A, B, or A and B."

Hereinafter, an electrocatalyst for oxygen reduction including a silver/silver halide composite, a fuel cell including the electrocatalyst for oxygen reduction, and a method for preparing the electrocatalyst for oxygen reduction will be explained in detail with reference to illustrative embodiments and examples. However, the present disclosure is not limited to the illustrative embodiments and the examples.

A first aspect of the present disclosure provides an electrocatalyst for oxygen reduction including a silver/silver halide composite.

In an illustrative embodiment, the silver halide may be combined in an alloy form with a surface and an interior of a silver nanomaterial by a spontaneous reduction reaction. However, the present disclosure may not be limited thereto. The silver/silver halide composite may be formed by performing a spontaneous reduction reaction through a Galvanic replacement reaction in the manner that a halogen precursor solution is dropwisely added to the silver nanomaterial. However, the present disclosure may not be limited thereto. The silver nanomaterial may include, for example, a silver nanowire. However, the present disclosure may not be limited thereto.

In an illustrative embodiment, the silver/silver halide composite may have a structure including nanopores depending on a concentration of the halogen precursor solution. However, the present disclosure may not by limited thereto. For example, in the halogen precursor solution, a metal concentration may be in the range of from about 1 mM to about 200 mM, from about 5 mM to about 200 mM, from about 10 mM to about 200 mM, from about 20 mM to about 200 mM, from about 30 mM to about 200 mM, from about 40 mM to about 200 mM, from about 50 mM to about 200 mM, from about 60 mM to about 200 mM, from about 70 mM to about 200 mM, from about 80 mM to about 200 mM, from about 90 mM to about 200 mM, from about 100 mM to about 200 mM, from about 1 mM to about 180 mM, from about 1 mM to about 150 mM, from about 1 mM to about 120 mM, from about 1 mM to about 100 mM, or from about 1 mM to about 50 mM. However, the present disclosure may not be limited thereto. For example, the nanopores may have a size of from about 1 nm to about 100 nm, from about 5 nm to about 100 nm, from about 10 nm to about 100 nm, from about 2 nm to about 100 nm, from about 30 nm to about 100 nm, from about 40 nm to about 100 nm, from about 50 nm to about 100 nm, from about 60 nm to about 100 nm, from about 70 nm to about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm, or from about 1 nm to about 10 nm. However, the present disclosure may not be limited thereto.

In an illustrative embodiment, a cross section of the silver nanowire may include a pentagon structure. An end part of the silver nanowire may include a circular structure. However, the present disclosure may not be limited thereto (refer to FIG. 2). A diameter of the silver nanowire may be about 200 nm or less, about 150 nm or less, or about 100 nm or less. However, the present disclosure may not be limited thereto.

In an illustrative embodiment, the silver halide may include silver chloride or silver bromide. However, the present disclosure may not be limited thereto.

In an illustrative embodiment, the silver/silver halide composite may include a form selected from the group consisting of a nanowire, a core-shell nanoparticle, and a bulk material. However, the present disclosure may not be limited thereto. For example, the bulk material may be in a powder form. However, the present disclosure may not be limited thereto.

In an illustrative embodiment, the silver/silver halide composite may include the silver and the halogen at a weight ratio of from about 99.0:about 1.0 to about 1.0:about 99.0. However, the present disclosure may not be limited thereto.

In an illustrative embodiment, the electrocatalyst for oxygen reduction of the present disclosure may be increased oxygen-reduction catalytic activity under an alkaline or acidic condition. However, the present disclosure may not be limited thereto.

In another illustrative embodiment, the electrocatalyst for oxygen reduction of the present disclosure may be increased its resistance to ethanol. However, the present disclosure may not be limited thereto.

A second aspect of the present disclosure provides a fuel cell including the electrocatalyst for oxygen reduction in accordance with the first aspect.

In an illustrative embodiment, the electrocatalyst for oxygen reduction may be included in a cathode electrode (electrode for reduction) of a fuel cell, or may be also included in an anode (electrode for oxidation). However, the present disclosure may not be limited thereto. The fuel cell including the electrocatalyst for oxygen reduction including the silver/silver halide composite can increase efficiency of an oxygen reduction reaction on a cathode electrode, compared to a conventional electrocatalyst for oxygen reduction including only platinum. In particular, the fuel cell can increase the efficiency of the oxygen reduction reaction even under the alkaline condition. Furthermore, since the fuel cell has increased its resistance to ethanol, it has a superior electron transfer property. In addition, since the fuel cell contains no platinum, it is advantageous in drastically reducing preparation costs for the fuel cell.

When ethanol is used as a fuel in a fuel cell, the ethanol may be reacted in a cathode, which corresponds to a fuel electrode. After the reaction, a product may be moved to an anode, which corresponds to an oxygen electrode. In case of pure platinum, due to a reaction with the product, voltage drop occurs in the whole fuel cell so that the efficiency of the fuel cell is deteriorated. However, the fuel cell including the electrocatalyst for oxygen reduction including the silver/silver halide binary component can minimize the problem.

A third aspect of the present disclosure provides a method for preparing the electrocatalyst for oxygen reduction in accordance with the first aspect of the present disclosure, including: forming a silver nanomaterial; and combining a silver halide with the silver nanomaterial.

In an illustrative embodiment, the silver nanomaterial may include, for example, a silver nanowire. However, the present disclosure may not be limited thereto.

In an illustrative embodiment, a modified polyol process may be further included in forming the silver nanomaterial. However, the present disclosure may not be limited thereto. The modified polyol process includes dissolving each of a silver precursor (e.g., $AgNO_3$) and polyvinylpyrrolidone (PVP), for example, in ethylene glycol (EG), combining the solutions, and then, removing the polyvinylpyrrolidone. The silver nanowire can be formed by the modified polyol process. The formed silver nanowire may also serve as a mold as well as a precursor in the process for combination with silver halide. Accordingly, the silver halide may be combined onto the silver nanowire. However, as shown in FIG. 2, it is identified that the silver nanowire can be prepared even when the modified polyol process is not performed.

In an illustrative embodiment, the process of combining the silver halide with the silver nanomaterial may include forming a silver/silver halide composite by performing a spontaneous reduction reaction via a Galvanic replacement reaction in the manner that a halogen precursor solution is dropwisely added to the silver nanomaterial. However, the present disclosure may not be limited thereto. The halogen precursor solution may include a halogen metal selected from the group consisting of chlorine, bromine, fluorine, and iodine. For example, the halogen precursor solution may include clorine or bromine, but may not be limited thereto. In the halogen precursor solution, a concentration of the halogen metal may be from about 1 mM to about 200 mM, for example, from about 5 mM to about 200 mM, from about 10 mM to about 200 mM, from about 20 mM to about 200 mM, from about 30 mM to about 200 mM, from about 40 mM to about 200 mM, from about 50 mM to about 200 mM, from about 60 mM to about 200 mM, from about 70 mM to about 200 mM, from about 80 mM to about 200 mM, from about 90 mM to about 200 mM, from about 100 mM to about 200 mM, from about 1 mM to about 180 mM, from about 1 mM to about 150 mM, from about 1 mM to about 120 mM, from about 1 mM to about 100 mM, or from about 1 mM to about 50 mM. However, the present disclosure may not be limited thereto. The silver/silver halide composite may include nanopores depending on the concentration of the halogen metal. However, the present disclosure may not be limited thereto.

A fourth aspect of the present disclosure provides a method for increasing stability of an electrocatalyst for oxygen reduction, including adding from about 0.1 mM to about 100 mM of NaCl to an anode electrolyte environment in which the oxygen reduction occurs. A concentration of the NaCl may be from about 0.1 mM to about 100 mM, from about 1 mM to about 100 mM, from about 5 mM to about 100 mM, from about 10 mM to about 100 mM, from about 20 mM to about 100 mM, from about 30 mM to about 100 mM, from about 40 mM to about 100 mM, from about 50 mM to about 100 mM, from about 0.1 mM to about 90 mM, from about 0.1 mM to about 80 mM, from about 0.1 mM to about 70 mM, from about 0.1 mM to about 60 mM, from about 0.1 mM to about 50 mM, from about 0.1 mM to about 40 mM, from about 0.1 mM to about 30 mM, from about 0.1 mM to about 20 mM, or from about 0.1 mM to about 10 mM, or for example, about 1 mM. However, the present disclosure may not be limited thereto. Since oxidation does not occur due to the addition of NaCl, the stability of the silver/silver halide composite can be improved. However, the present disclosure may not be limited thereto. The silver/silver halide is subject to all the descriptions of the silver/silver halide included in the above-described electrocatalyst for oxygen reduction. For convenience in explanation, the overlapping descriptions of the silver/silver halide are omitted hereinafter.

A fifth aspect of the present disclosure provides a fuel electrode for a fuel cell. Since the silver/silver halide composite has a superior electron transfer property, it can provide excellent activity as an electrocatalyst of a fuel electrode. The silver/silver halide is subject to all the descriptions of the silver/silver halide included in the above-described electrocatalyst for oxygen reduction. For convenience in explanation, the overlapping descriptions polyvinylpyrrolidone are omitted hereinafter.

Hereinafter the method for preparing the electrocatalyst for oxygen reduction including the silver/silver halide composite of the present disclosure will be described in detail with reference to FIG. 1. FIG. 1 is a sequence view for preparing the electrocatalyst for oxygen reduction including the silver/silver halide composite in accordance with an illustrative embodiment of the present disclosure. This sequence view can be applied to another electrocatalyst, e.g., an electrocatalyst for fuel-oxidation.

First, a silver nanowire is formed (S110).

The silver nanowire may be formed, for example, by a modified polyol process, but may not be limited thereto. The modified polyol process includes dissolving each of a silver precursor (e.g., $AgNO_3$) and polyvinylpyrrolidone (PVP), for example, in ethylene glycol (EG), combining the solutions, and then, removing the polyvinylpyrrolidone. The silver nanowire may be formed by the modified polyol process. The formed silver nanowire can also serve as a mold as well as a precursor in the process for combination with a silver halide, e.g., silver chloride or silver bromide. Accordingly, the silver halide may be combined onto the silver nanowire. A cross section of the silver nanowire may include a pentagon structure. An end part of the silver nanowire may include a circular structure. However, the present disclosure may not be limited thereto (refer to FIG. 2). A diameter of the silver nanowire may be about 200 nm or less, about 150 nm or less, or about 100 nm or less. However, the present disclosure may not be limited thereto.

Subsequently, the silver halide is combined with the silver nanowire thereby forming a silver/silver chloride or silver/silver bromide binary nanowire (S130).

Combining the silver halide with the silver nanowire may be performed by a method including performing a spontaneous reduction reaction via a Galvanic replacement reaction in the manner that a halogen precursor solution is dropwisely added to the silver nanowire (S120). However, the present disclosure may not be limited thereto. For example, the silver/silver chloride or silver/silver bromide binary nanowire may be formed by dropwisely adding a halogen precursor solution, e.g., a $FeCl_3$ or $FeBr_3$ solution to the silver nanowire. Specifically, due to a difference in a standard reduction potential between silver particles of the silver nanowire and metal ions of the halogen precursor, e.g., $Fe^{3+}$, the metal ions are reduced to $Fe^{2+}$ on a surface and/or in an interior of the silver nanowire. Simultaneously, part of the silver from the silver nanowire is oxidized so that the silver halide is formed on the surface of the silver nanowire. Accordingly, the silver/silver halide binary nanowire, in which silver halide is combined onto the silver nanowire, can be formed.

In an illustrative embodiment, the silver/(silver halide) binary nanowire may have a structure including nanopores depending on a concentration of the halogen precursor solution. However, the present disclosure may not be limited thereto. For example, in the halogen precursor solution, a metal concentration may include a range of from about 1 mM to about 200 mM, from about 5 mM to about 150 mM, or from about 10 mM to about 100 mM. However, the present disclosure may not be limited thereto. The nanopores may have, for example, a size of from about 1 nm to about 100. However, the present disclosure may not be limited thereto.

Hereinafter, the present disclosure will be described in more detail by using examples, but is not limited to the examples.

EXAMPLES

Example 1

Preparation of a Silver Nanowire

A silver nanowire was prepared by using the modified polyol process. Specifically, 10.0 mL of ethylene glycol (EG) was injected into a round-bottom flask having a coolant, a temperature controller, and a magnetic stirring bar, and heated at 170° C. for 1 hour.

6 mL of 0.12 M silver nitride and 6 mL of 0.36 M PVP, which use ethylene glycol as a solvent, were prepared and slowly injected into the ethylene glycol of 170° C. for about minutes by using a syringe. In this case, the temperature of 170° C. should be continuously maintained. After the injection, the ethylene glycol was boiled at 170° C. for one extra hour such that silver seeds can be sufficiently reduced. During all the processes, the ethylene glycol was stirred by using the spin bar. The synthesized silver nanowire was washed with ethanol and acetone by using a centrifuge so that the PVP and the ethylene glycol were removed. The washed silver nanowire was placed in a vial and dried to obtain a silver nanowire in the solid powder state. Thereafter, the silver nanowire was dispersed in water such that 2 mg/mL was reached. FIG. 2 shows TEM and SEM photographs of the obtained silver nanowire.

Example 2

Synthesis of an Ag/AgCl Core/Shell Nanowire and an Ag/Ag/Br Core/Shell Nanowire

In synthesizing Ag/AgCl core/shell nanowires and Ag/AgBr core/shell nanowires, the nanowires were divided depending on existence of injection of PVP. First, 500 mM $FeCl_3$ and $FeBr_3$ stock solution and 500 mM PVP stock solution were prepared. Each of the stock solutions was dissolved in water as a solvent.

Figure 3:
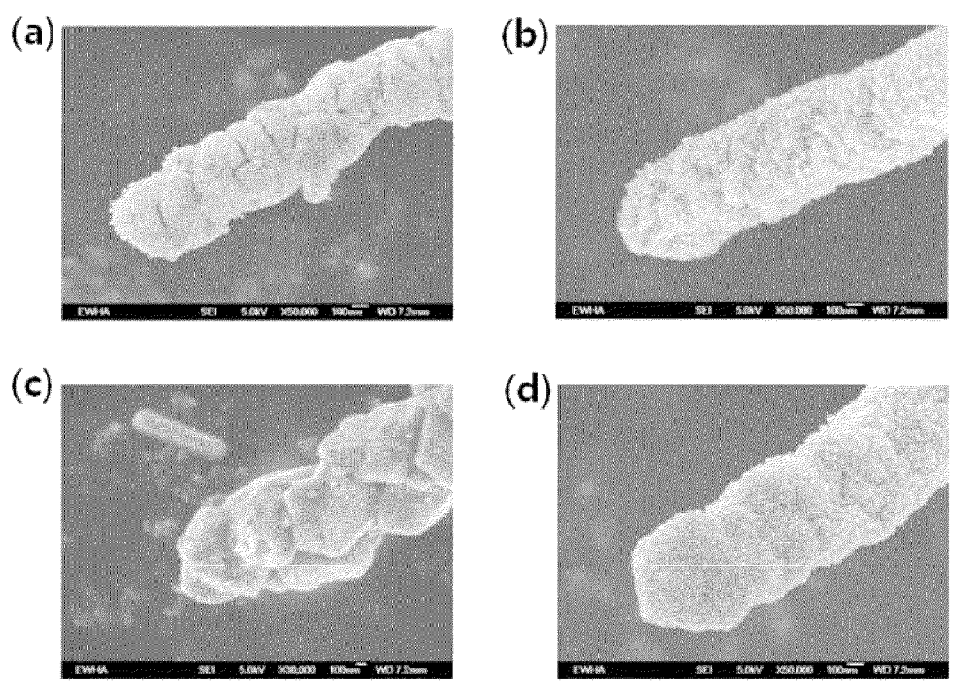
FIG. 3 provides SEM photographs of a silver/silver chloride (Ag/AgCl) nanowire or a silver/silver bromide (Ag/AgBr) nanowire depending on the presence of polyvinylpyrrolidone in an example of the present disclosure.

The method for synthesizing Ag/AgCl core/shell nanowires will be described. The $FeCl_3$ stock solution was injected into 1 mL of the silver nanowire prepared in Example 1 and dispersed in water, so as to be 100 mM. The PVP stock solution was injected into 1 mL of another silver nanowire, so as to be 50 mM. After 5 minutes, the $FeCl_3$ stock solution was injected thereinto such that 100 mM was reached. After the injection of the $FeCl_3$ solution, the two reaction solutions were reacted for 10 minutes. In order to synthesize Ag/AgBr core/shell nanowires, the same synthesis as that for the Ag/AgCl core/shell nanowires was performed while using the $FeBr_3$ stock solution. The reactions were proceeded with only for 5 minutes. All the reactions were proceeded with at a room temperature while being stirred by a magnetic stirrer. After the reactions finished, Fe, Cl, and Br ions and PVP remaining in the water were removed by using a centrifuge. The Ag/AgBr core/shell nanowires and the Ag/AgCl core/shell nanowires were dried to obtain materials in the solid powder state. The materials were dispersed in water such that 2 mg/mL was reached. SEM photographs of the obtained silver/silver halide nanowires and the silver/silver bromide nanowiers are illustrated in FIG. 3 [(a) the Ag/AgCl core/shell nanowire, in which PVP was not used; (b) the Ag/AgCl core/shell nanowire, in which PVP was used; (c) the Ag/AgBr core/shell nanowire in which PVP was not used; and (d) the Ag/AgBr core/shell nanowire, in which PVP was used].

Example 3

Synthesis of AgCl and AgBr Bulks

Each of 5 mL of a 0.1 M $AgNO_3$ solution, 5 mL of a 0.1 M NaCl solution and 5 mL of a NaBr solution was prepared in a 20 mL vial. In the vial containing $AgNO_3$, $AgNO_3$ was continuously stirred by a spin bar. Each of the NaCl solution and the NaBr solution was injected into a syringe such that the solutions were injected into the vial at a constant rate for 10 minutes by using the syringe pump. By a Galvanic replacement reaction, each of Bulks AgCl and AgBr sank to the bottom of the vial. The bulks were separated by using a centrifuge and dried so that solid AgCl and AgBr were obtained.

Experimental Example 1

Electrochemical Measurement

An electrochemical test used in Experimental Example 1 is a rotating disk electrode (RDE) test. Electrodes used in the electrochemistry include a work electrode, a reference electrode, and an auxiliary electrode. In Experimental Example 1, a glassy carbon (GC) electrode having a diameter of 3 mm was used as the work electrode. A saturated calomel electrode (S.C.E) was used as the reference electrode. A Pt wire was used as the auxiliary electrode. All samples were dispersed in water to have a density of 2.0 μg/μL and blended uniformly by using a vortex machine for more than 10 minutes. Thereafter, 6.0 μL was taken and dropped onto the GC electrode and dried. This process was repeated 5 times so that total 30.0 μL samples were put on the electrode. 10.0 μL of 0.05 wt % Nafion diluted with ethanol was dropwisely added thereto and completely dried.

An oxygen reduction reaction (ORR) activity test was conducted in a 0.1 M NaOH solution. Prior to the test, the NaOH solution was saturated with oxygen gas and argon gas for about 20 minutes. In this case, a voltage scan rate was 10 mV/s. A measurement voltage range was 0.1 V to −0.8 V. The spin rate of the electrode was measured at 100, 400, 900, 1,600, 2,500 and 3,600 rpm. The ORR activity test for Bulk AgCl was conducted in the same manner as described above at a NaCl concentration of 0, 0.01, 0.1, 1, 10, and 100 mM for measurement of an anion effect.

The RDE stability test for Bulk AgCl was conducted in a 0 mM and 1 mM NaCl+0.1 M NaOH solution. After measurement of linear sweep voltammetry (LSV), CV having 50 cycles was operated. Thereafter, LSV was measured once again. This process was repeated 20 times (total 1,000 cycles).

Results of the RDE tests in Examples 1 to 3 are illustrated in FIGS. 4 to 9.

Figure 4:
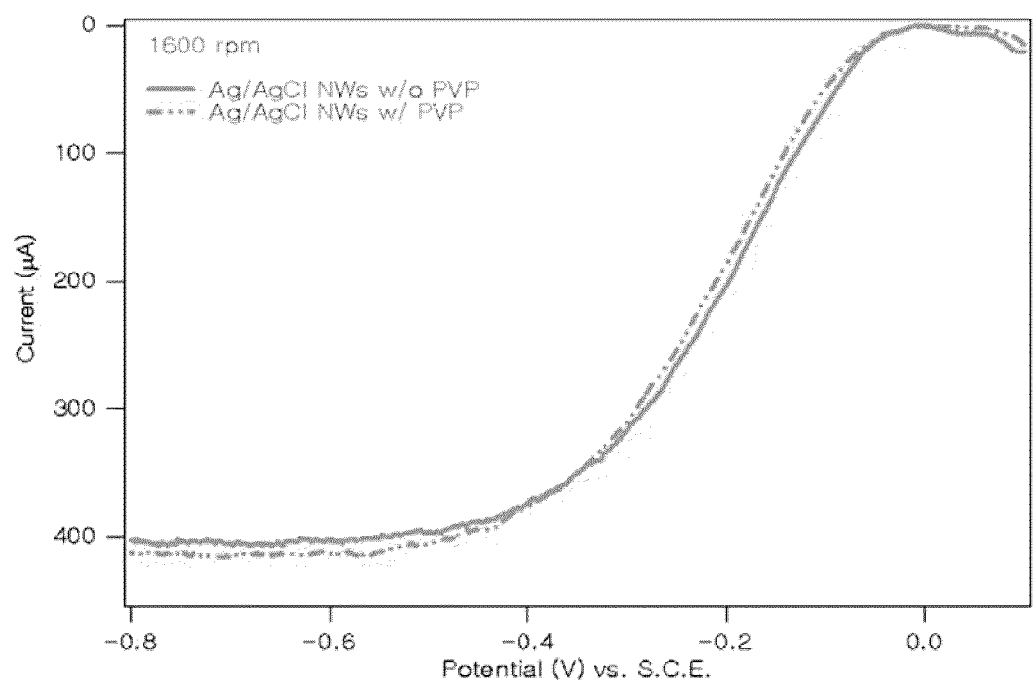
FIG. 4 provides results of a rotating disk electrode (RDE) test conducted in a 0.1 M NaOH solution for oxygen reduction with respect to a silver/silver chloride (Ag/AgCl) nanowire depending on the presence of polyvinylpyrrolidone in an example of the present disclosure.

FIG. 4 provides RDE voltammetry results, in which the Ag/AgCl nanowires synthesized in the oxygen-saturated 0.1 M NaOH solution depending upon the use of PVP have similar activity to an oxygen reduction reaction.

Figure 5:
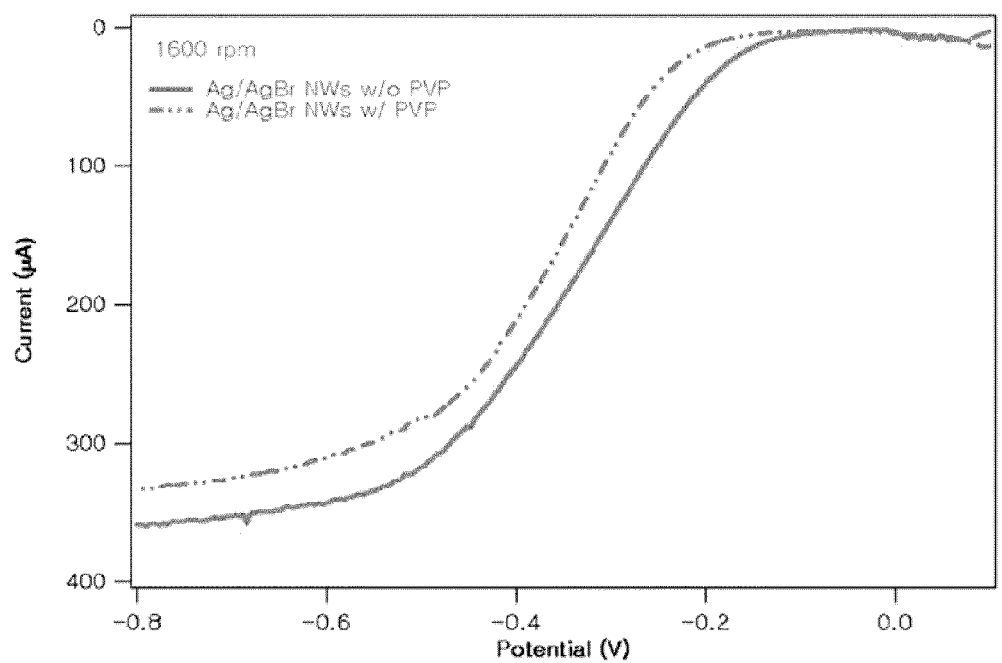
FIG. 5 provides results of a RDE test conducted in a 0.1 M NaOH solution for oxygen reduction with respect to a silver/silver bromide (Ag/AgBr) nanowire depending on the presence of polyvinylpyrrolidone in an example of the present disclosure.

FIG. 5 provides RDE voltammetry results, in which the Ag/AgBr nanowires synthesized in the oxygen-saturated 0.1 M NaOH solution depending on the use of PVP have different activities to an oxygen reduction reaction. It is identified that the catalytic activity of the Ag/AgCl nanowire synthesized without the use of PVP is better.

Figure 6:
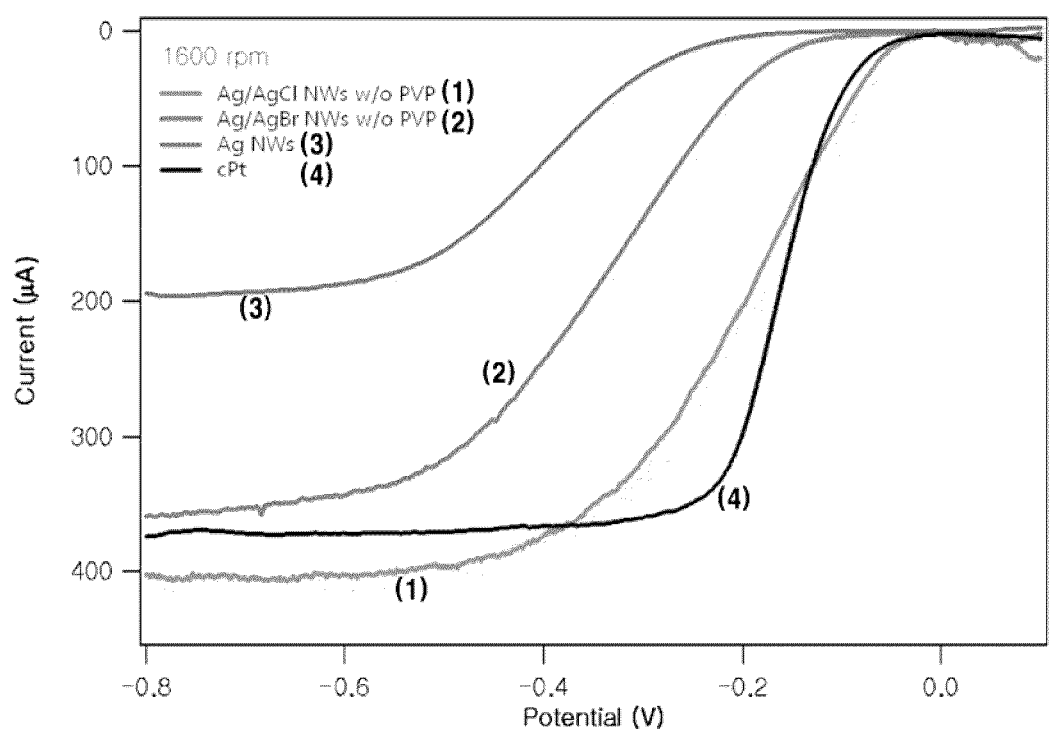
FIG. 6 compares results of RDE tests conducted in a 0.1 M NaOH solution for oxygen reduction with respect to silver/silver chloride (Ag/AgCl) and silver/silver bromide (Ag/AgBr) nanowires, which were synthesized without polyvinylpyrrolidone, a pure silver nanowire, and a commercial platinum catalyst (ETEK), in accordance with an example of the present disclosure.

FIG. 6 provides results of comparison for catalyst activities of the Ag nanowire, the Ag/AgCl nanowire, the Ag/AgBr nanowire, and a commercial Pt to an oxygen reduction reaction via RDE voltammetry in an oxygen-saturated 0.1 M NaOH solution. It is identified that since the Ag/AgCl nanowire enables oxygen reduction to start at a lower voltage than that for the commercial Pt, the Ag/AgCl nanowire has comparable activity with that of the commercial Pt.

Figure 7:
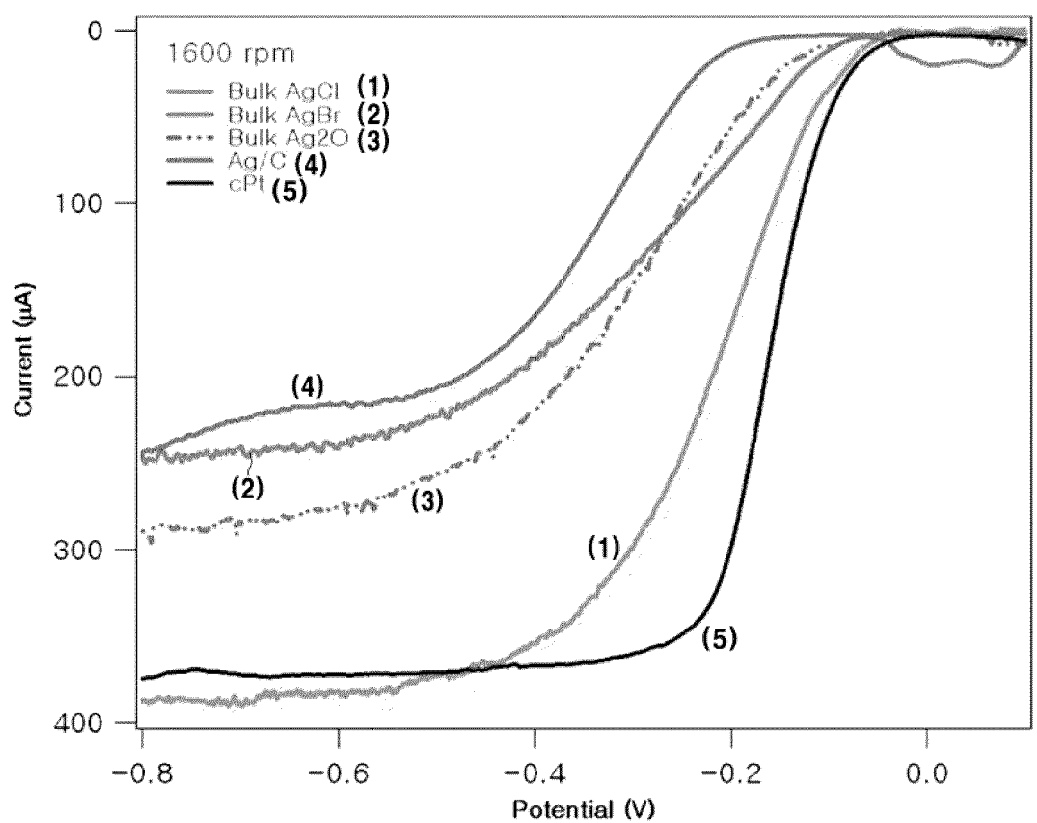
FIG. 7 compares results of RDE tests conducted in a 0.1 M NaOH solution for oxygen reduction with respect to silver/silver chloride (Ag/AgCl) and silver/silver bromide (Ag/AgBr) bulk materials, which were synthesized in bulk, silver oxide ($Ag_2O$), a silver nanoparticle/carbon support, and a commercial platinum catalyst (ETEK) in accordance with an example of the present disclosure.

FIG. 7 provides results of comparison for catalytic activities of Bulk AgCl, Bulk AgBr, $Ag_2O$, carbon-supported Ag nanoparticles, not a nanowire structure, and a commercial Pt to oxygen reduction via RDE voltammetry in an oxygen-saturated 0.1 M NaOH solution. It is identified that the activity of them is slightly poor compared to that of the Ag/AgCl having a nanowire structure, but still comparable with that of the commercial Pt. In particular, since the activity of AgCl is much better than the oxygen reduction activity of $Ag_2O$, it is identified that the ionic chloride is important.

Figure 8:
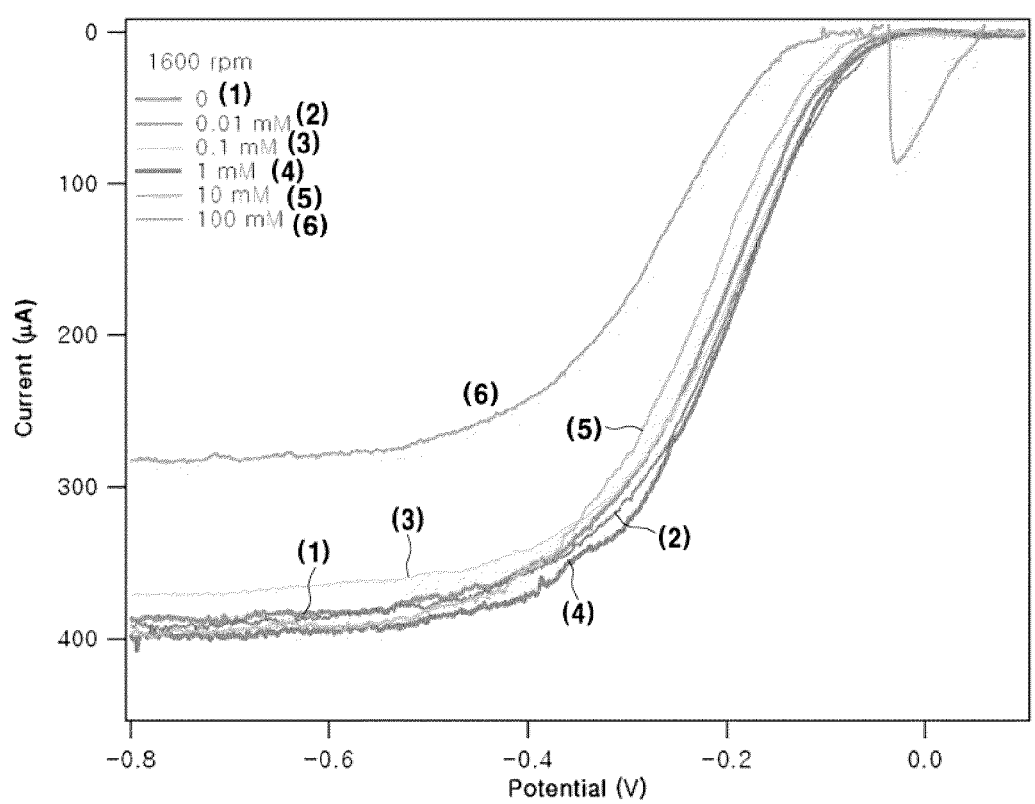
FIG. 8 compares results of a RDE test conducted at 1,600 rpm in a 0.1 M NaOH for oxygen reduction with respect to oxygen reduction of bulk-synthesized silver/silver chloride (Ag/AgCl) depending on a change of NaCl concentration.

FIG. 8 provides results of comparison for catalytic activity stability of Bulk AgCl to oxygen reduction via RDE voltammetry in an oxygen-saturated 0.1 M NaOH solution under the presence of 0, 0.01, 0.1, 1, 10, and 100 mM NaCl. 1 mM of NaCl concentration is best. When the concentration of NaCl is optimum, it is confirmed that the catalytic activity get better. Accordingly, it is further confirmed that the ionic chloride is important.

Figure 9:
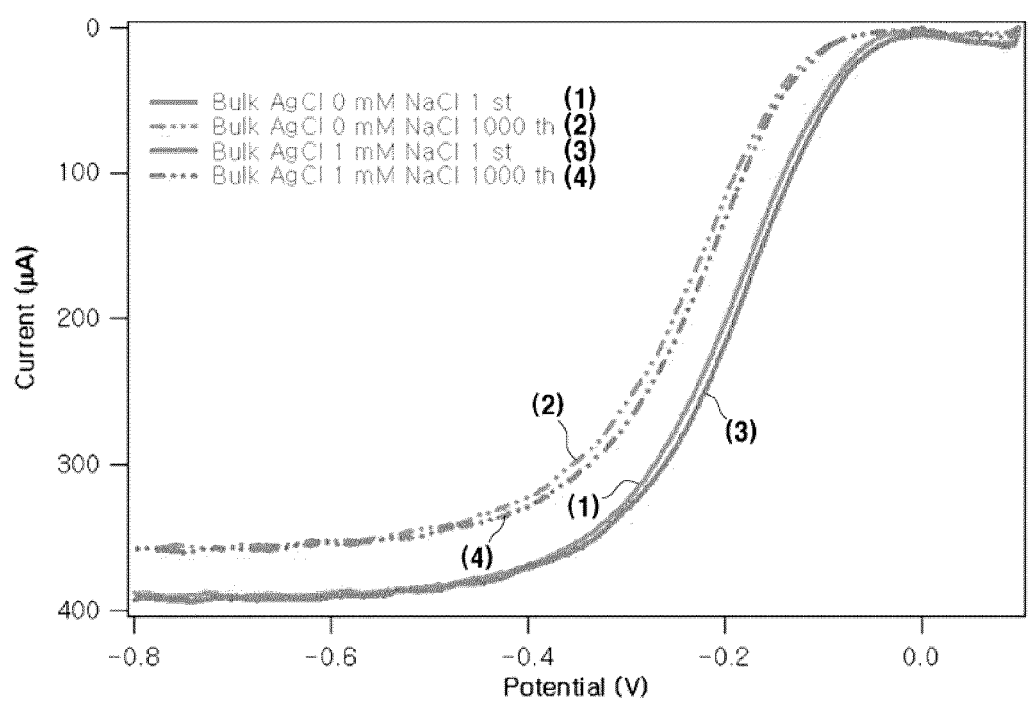
FIG. 9 shows stability of a catalyst with respect to an oxygen reduction reaction of bulk-synthesized silver/silver chloride (Ag/AgCl) through a RDE test in a 0.1 M NaOH (containing 1 mM NaCl) solution in an example of the present disclosure.

FIG. 9 provides results of comparison for catalytic activity of Bulk AgCl to oxygen reduction via RDE voltammetry in an oxygen-saturated 0.1 M NaOH solution under the presence of 0 and 1 mM NaCl. In comparison to RDE prior to and after repeating the RDE test 1,000 times in the environment where NaCl exists, we can identify very stable in both cases.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. An electrocatalyst for oxygen reduction comprising:
a silver/silver halide composite, wherein the silver/silver halide composite is synthesized without using polyvinylpyrrolidone solution to combine silver with silver halide so that the silver/silver halide composite has a rough surface compared to a silver/silver halide composite synthesized with using polyvinylpyrrolidone solution,
wherein the silver/silver halide composite includes nanopores having a size of from about 1 nm to about 100 nm,
wherein the silver/silver halide composite comprises a silver/silver halide core/shell nanowire and a surface of the silver/silver halide core/shell nanowire comprises silver halide,
wherein a catalytic activity for the oxygen reduction is increased under an alkaline or acidic condition compared to a platinum catalyst, and
wherein a resistance of the electrocatalyst to ethanol is increased compared to a platinum catalyst.

2. The electrocatalyst for oxygen reduction of claim 1, wherein the silver halide is combined in an alloy form with a surface and an interior of a silver nanomaterial by a spontaneous reduction reaction.

3. The electrocatalyst for oxygen reduction of claim 1, wherein the silver halide includes silver chloride or silver bromide.

4. The electrocatalyst for oxygen reduction of claim 1, wherein the silver/silver halide composite includes the silver and the halogen at a weight ratio of from about 99.0:about 1.0 to about 1.0:about 99.0.

5. The electrocatalyst for oxygen reduction of claim 2, wherein a diameter of the silver nanomaterial is about 200 nm or less.

6. A fuel cell comprising the electrocatalyst for oxygen reduction according to claims 1.

7. A method for preparing the electrocatalyst for oxygen reduction according to claims 1, comprising:
forming a silver nanomaterial; and
combining a silver halide with the silver nanomaterial without using polypyrrolidone solution.

8. The method for preparing the electrocatalyst for oxygen reduction of claim 7, wherein a modified polyol process is further included in forming the silver nanomaterial.

9. The method for preparing the electrocatalyst for oxygen reduction of claim 7, wherein the combining the silver halide with the silver nanomaterial includes performing a spontaneous reduction reaction via a Galvanic replacement reaction in the manner that a halogen precursor solution is dropwisely added to the silver nanomaterial.

10. The method for preparing the electrocatalyst for oxygen reduction of claim 7, wherein a concentration of a metal in the halogen precursor solution is from about 1 mM to about 200 mM.

11. A method for increasing stability of an electrocatalyst for oxygen reduction, comprising adding from about 0.1 mM to about 100 mM of NaCl to an anode electrolyte environment in which the oxygen reduction occurs.

12. A fuel electrode for a fuel cell comprising:
a silver/silver halide composite wherein the silver/silver halide composite is synthesized without using polyvinylpyrrolidone solution to combine silver with silver halide so that the silver/silver halide composite has a rough surface compared to a silver/silver halide composite synthesized with using polyvinylpyrrolidone solution,
wherein the silver/silver halide composite includes nanopores having a size of from about 1 nm to about 100 nm,
wherein the silver/silver halide composite comprises a silver/silver halide core/shell nanowire and a surface of the silver/silver halide core/shell nanowire comprises silver halide,
wherein a catalytic activity of the fuel electrode for the oxygen reduction is increased under an alkaline or acidic condition compared to a platinum catalyst, and
wherein a resistance of the fuel electrode to ethanol is increased compared to a platinum catalyst.

* * * * *